US012205214B2

(12) United States Patent
Starke et al.

(10) Patent No.: US 12,205,214 B2
(45) Date of Patent: Jan. 21, 2025

(54) JOINT TWIST GENERATION FOR ANIMATION

(71) Applicant: Electronic Arts Inc., Redwood City, CA (US)

(72) Inventors: Wolfram Sebastian Starke, Edinburgh (GB); Harold Henry Chaput, Castro Valley, CA (US); Yiwei Zhao, Sunnyvale, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/678,947

(22) Filed: Feb. 23, 2022

(65) Prior Publication Data
US 2023/0267668 A1 Aug. 24, 2023

(51) Int. Cl.
G06T 13/40 (2011.01)

(52) U.S. Cl.
CPC ..................... G06T 13/40 (2013.01)

(58) Field of Classification Search
None
See application file for complete search history.

(56) References Cited

U.S. PATENT DOCUMENTS

| | | | |
|---|---|---|---|
| 5,274,801 A | 12/1993 | Gordon | |
| 5,548,798 A | 8/1996 | King | |
| 5,982,389 A | 11/1999 | Guenter et al. | |
| 5,999,195 A | 12/1999 | Santangeli | |
| 6,064,808 A | 5/2000 | Kapur et al. | |
| 6,088,040 A | 7/2000 | Oda et al. | |
| 6,253,193 B1 | 6/2001 | Ginter et al. | |
| 6,556,196 B1 | 4/2003 | Blanz et al. | |
| 6,961,060 B1 | 11/2005 | Mochizuki et al. | |
| 7,006,090 B2 | 2/2006 | Mittring | |
| 7,403,202 B1 | 7/2008 | Nash | |
| 7,415,152 B2 | 8/2008 | Jiang et al. | |
| 7,944,449 B2 | 5/2011 | Petrovic et al. | |
| 8,100,770 B2 | 1/2012 | Yamazaki et al. | |

(Continued)

FOREIGN PATENT DOCUMENTS

| | | |
|---|---|---|
| CN | 102509272 A | 6/2012 |
| CN | 103546736 A | 1/2014 |

(Continued)

OTHER PUBLICATIONS

Min et al., "Interactive Generation of Human Animation with Deformable Motion Models" (Year: 2009).*

(Continued)

Primary Examiner — Hilina K Demeter
(74) Attorney, Agent, or Firm — Knobbe, Martens, Olson & Bear, LLP

(57) ABSTRACT

The present disclosure provides embodiments for joint twist generation for animation. The system can utilize a neural network, also referred to as a deep neural network, which utilizes machine learning processes in order to create animation data that are more life-like and realistic. The system can obtain a set of axis vectors for a rig of a virtual character model; obtain a twist model for the rig; input the set of axis vectors to the twist model to obtain a set of twist vectors; and determine animation data based on the set of axis vectors and the set of twist vectors.

17 Claims, 10 Drawing Sheets

(56) References Cited

U.S. PATENT DOCUMENTS

| | | |
|---|---|---|
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,117,134 B1 | 8/2015 | Geiss et al. |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,652,879 B2 | 5/2017 | Aguado |
| 9,741,146 B1 | 8/2017 | Nishimura |
| 9,811,716 B2 | 11/2017 | Kim et al. |
| 9,826,898 B1 | 11/2017 | Jin et al. |
| 9,858,700 B2 | 1/2018 | Rose et al. |
| 9,861,898 B2 | 1/2018 | Miura et al. |
| 9,947,123 B1 | 4/2018 | Green |
| 9,984,658 B2 | 5/2018 | Bonnier et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,198,845 B1 | 2/2019 | Bhat et al. |
| 10,314,477 B1 | 6/2019 | Goodsitt et al. |
| 10,388,053 B1 | 8/2019 | Carter, Jr. et al. |
| 10,403,018 B1 | 9/2019 | Worsham |
| 10,440,443 B2 | 10/2019 | Casey et al. |
| 10,535,174 B1 | 1/2020 | Rigiroli et al. |
| 10,726,611 B1 | 7/2020 | Court |
| 10,733,765 B2 | 8/2020 | Andreev |
| 10,755,466 B2 | 8/2020 | Chamdani et al. |
| 10,792,566 B1 | 10/2020 | Schmid |
| 10,825,220 B1 | 11/2020 | Chang et al. |
| 10,856,733 B2 | 12/2020 | Anderson et al. |
| 10,860,838 B1 | 12/2020 | Elahie et al. |
| 10,878,540 B1 | 12/2020 | Stevens |
| 10,902,618 B2 | 1/2021 | Payne et al. |
| 10,986,400 B2 | 4/2021 | Hua et al. |
| 11,017,560 B1 | 5/2021 | Gafni et al. |
| 11,403,513 B2 | 8/2022 | Hasenclever et al. |
| 11,562,523 B1 | 1/2023 | Starke et al. |
| 11,670,030 B2 | 6/2023 | Shi et al. |
| 11,830,121 B1 | 11/2023 | Starke et al. |
| 2002/0054054 A1 | 5/2002 | Sanbe |
| 2002/0089504 A1 | 7/2002 | Merrick et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0149516 A1 | 7/2006 | Bond et al. |
| 2006/0217945 A1 | 9/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0273039 A1 | 11/2008 | Girard |
| 2008/0316202 A1 | 12/2008 | Zhou et al. |
| 2009/0066700 A1 | 3/2009 | Harding et al. |
| 2009/0195544 A1 | 8/2009 | Wrinch et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0277497 A1 | 11/2010 | Dong et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0269540 A1 | 11/2011 | Gillo et al. |
| 2011/0292055 A1 | 12/2011 | Hodgins et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0275521 A1 | 11/2012 | Cui et al. |
| 2012/0303343 A1 | 11/2012 | Sugiyama et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0311885 A1 | 11/2013 | Wang et al. |
| 2014/0002463 A1 | 1/2014 | Kautzman et al. |
| 2014/0198106 A1 | 7/2014 | Sumner et al. |
| 2014/0198107 A1 | 7/2014 | Thomaszewski et al. |
| 2014/0285513 A1 | 9/2014 | Aguado |
| 2014/0327694 A1 | 11/2014 | Cao et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0042548 A1 | 2/2016 | Du et al. |
| 2016/0071470 A1 | 3/2016 | Kim et al. |
| 2016/0217723 A1 | 7/2016 | Kim et al. |
| 2016/0307369 A1 | 10/2016 | Freedman et al. |
| 2016/0314617 A1 | 10/2016 | Forster et al. |
| 2016/0354693 A1 | 12/2016 | Yan et al. |
| 2017/0132827 A1 | 5/2017 | Tena et al. |
| 2017/0221250 A1* | 8/2017 | Aguado ............... G06T 13/40 |
| 2017/0301310 A1 | 10/2017 | Bonnier et al. |
| 2017/0301316 A1 | 10/2017 | Farell |
| 2018/0122125 A1* | 5/2018 | Brewster ............. G06T 13/40 |
| 2018/0165864 A1 | 6/2018 | Jin et al. |
| 2018/0211102 A1 | 7/2018 | Alsmadi |
| 2018/0239526 A1 | 8/2018 | Varanasi et al. |
| 2018/0293736 A1 | 10/2018 | Rahimi et al. |
| 2019/0073826 A1* | 3/2019 | Bailey ............... G06T 17/205 |
| 2019/0147224 A1 | 5/2019 | Li et al. |
| 2019/0228316 A1 | 7/2019 | Felsen et al. |
| 2019/0295305 A1* | 9/2019 | Yang .................. G06N 3/044 |
| 2019/0340803 A1* | 11/2019 | Comer ............... G06T 13/40 |
| 2019/0392587 A1 | 12/2019 | Nowozin et al. |
| 2020/0005138 A1* | 1/2020 | Wedig ............... G06V 40/19 |
| 2020/0035009 A1* | 1/2020 | Comer ............... G06V 10/763 |
| 2020/0058148 A1 | 2/2020 | Blaylock et al. |
| 2020/0294299 A1 | 9/2020 | Rigiroli et al. |
| 2020/0353311 A1 | 11/2020 | Ganguly et al. |
| 2020/0388065 A1* | 12/2020 | Miller, IV ........... G06T 13/40 |
| 2020/0402284 A1 | 12/2020 | Saragih et al. |
| 2021/0019916 A1 | 1/2021 | Andreev |
| 2021/0166459 A1 | 6/2021 | Miller, IV |
| 2021/0217184 A1 | 7/2021 | Payne et al. |
| 2021/0220739 A1 | 7/2021 | Zinno et al. |
| 2021/0292824 A1 | 9/2021 | Zhang et al. |
| 2021/0335004 A1 | 10/2021 | Zohar et al. |
| 2021/0375021 A1 | 12/2021 | Starke et al. |
| 2021/0383585 A1 | 12/2021 | Zhao et al. |
| 2021/0406765 A1 | 12/2021 | Zhang et al. |
| 2022/0035443 A1* | 2/2022 | Winold ............... G06V 20/20 |
| 2022/0068000 A1* | 3/2022 | Herman ............. G06T 13/40 |
| 2022/0101646 A1 | 3/2022 | McDonald et al. |

(56) References Cited

U.S. PATENT DOCUMENTS

| | | | |
|---|---|---|---|
| 2022/0215232 | A1 | 7/2022 | Pardeshi et al. |
| 2022/0230376 | A1 | 7/2022 | Rozantsev et al. |
| 2022/0254157 | A1 | 8/2022 | Fu et al. |
| 2022/0319087 | A1 | 10/2022 | Zhang |
| 2023/0010480 | A1 | 1/2023 | Li et al. |
| 2023/0177755 | A1 | 6/2023 | Starke et al. |
| 2023/0186543 | A1 | 6/2023 | Starke et al. |
| 2023/0237724 | A1 | 7/2023 | Starke et al. |
| 2023/0310998 | A1 | 10/2023 | Starke et al. |
| 2023/0394735 | A1 | 12/2023 | Shi et al. |

FOREIGN PATENT DOCUMENTS

| | | |
|---|---|---|
| CN | 105405380 A | 3/2016 |
| CN | 105825778 A | 8/2016 |
| CN | 110039546 A | 7/2019 |
| JP | 2018-520820 A | 8/2018 |
| JP | 2019-162400 A | 9/2019 |
| WO | WO 2019/184633 A1 | 10/2019 |
| WO | WO 2020/204948 A1 | 10/2020 |

OTHER PUBLICATIONS

Yamane et al., "Natural Motion Animation through Constraining and Deconstraining at Will" (Year: 2003).*
Anagnostopoulos et al., "Intelligent modification for the daltonization process", International Conference on Computer Vision Published in 2007 by Applied Computer Science Group of digitized paintings.
Andersson et al., "Virtual Texturing with WebGL," Master's thesis, Chalmers University of Technology, Gothenburg, Sweden (2012).
Avenali, "Color Vision Deficiency and Video Games", The Savannah College of Art and Design, Mar. 2013.
Badlani et al., "A Novel Technique for Modification of Images for Deuteranopic Viewers", May 2016.
Belytschko et al., "Assumed strain stabilization of the eight node hexahedral element," Computer Methods in Applied Mechanics and Engineering, vol. 105(2), pp. 225-260 (1993), 36 pages.
Belytschko et al., Nonlinear Finite Elements for Continua and Structures, Second Edition, Wiley (Jan. 2014), 727 pages (uploaded in 3 parts).
Blanz et al., "A morphable model for the synthesis of 3D faces," In Proceedings of the 26th annual conference on Computer graphics and interactive techniques Jul. 1, 1999 (pp. 187-194). ACM Press/Addison-Wesley Publishing Co.
Blanz et al., "Reanimating Faces in Images and Video" Sep. 2003, vol. 22, No. 3, pp. 641-650, 10 pages.
Chao et al., "A Simple Geometric Model for Elastic Deformations", 2010, 6 pgs.
Clavet, "Motion matching and the road to next-gen animation," In Proc. of GDC. 2016 (Year: 2016).
Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear inProceedings of the 2011 ACM SIGGRAPH/Eurographics Symposium on Computer Animation (2011), 10 pgs.
Dudash, "Skinned instancing." NVidia white paper(2007).
Fikkkan, "Incremental loading of terrain textures," MS thesis. Institutt for datateknikk og informasjonsvitenskap, 2013.
Geijtenbeek et al., "Interactive Character Animation using Simulated Physics", Games and Virtual Worlds, Utrecht University, The Netherlands, The Eurographics Association 2011, 23 pgs.
Geijtenbeek et al. Interactive Character Animation Using Simulated Physics: A State-of-the-Art Review), Computer Graphics forum, vol. 31, 2012 (Year: 2012), 24 pgs.
Georgii et al., "Corotated Finite Elements Made Fast and Stable", Workshop in Virtual Reality Interaction and Physical Simulation VRIPHYS (2008), 9 pgs.
Habbie et al., "A Recurrent Variational Autoencoder for Human Motion Synthesis", 2017, in 12 pages.
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.
Han et al., "On-line Real-time Physics-based Predictive Motion Control with Balance Recovery," Eurographics, vol. 33(2), 2014, 10 pages.
Hernandez et al., "Simulating and visualizing real-time crowds on GPU clusters." Computacion y Sistemas 18.4 (2014): 651-664.
Holden et al., "Phase-functioned neural networks for character control," ACM Transactions on Graphics (TOG). Jul. 20, 2017;36(4): 1-3. (Year: 2017).
Hu et al., "face recognition by an albedo based 3D morphable model," In Biometrics (IJCB), 2014 IEEE International Joint Conference on Sep. 29, 2014 (pp. 1-8). IEEE.
Hu, "Face Analysis using 3D Morphable Models," Ph.D. Thesis, University of Surrey, Apr. 2015, pp. 1-112.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Klein, "Rendering Textures Up Close in a 3D Environment Using Adaptive Micro-Texturing," Diss. Mills College, 2012.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
McDonnell et al., "Clone attack! perception of crowd variety." ACM Transactions on Graphics (TOG). vol. 27. No. 3. ACM, 2008.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse et al., "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.

(56) References Cited

OTHER PUBLICATIONS

Parker et al., "Real-Time Deformation and Fracture in a Game Environment", Eurographics/ACM SIGGRAPH Symposium on Computer Animation (2009), 12 pgs.

Pelechano et al., "Controlling individual agents in high-density crowd simulation." Proceedings of the 2007 ACM SIGGRAPH/ Eurographics symposium on Computer animation. Eurographics Association, 2007. APA.

Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

Ruiz, "Reducing memory requirements for diverse animated crowds." Proceedings of Motion on Games. ACM, 2013.

Rungjiratananon et al., "Elastic Rod Simulation by Chain Shape Matching withTwisting Effect"SIGGRAPH Asia 2010, Seoul, South Korea, Dec. 15-18, 2010, ISBN 978-1-4503-0439-9/10/0012, 2 pgs.

Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.

Sifakis, Eftychios D., "FEM Simulations of 3D Deformable Solids: A Practitioner's Guide to Theory, Discretization and Model Reduction. Part One: The Classical FEM Method and Discretization Methodology", SIGGRAPH 2012 Course, Version 1.0 [Jul. 10, 2012], 50 pgs.

Starke et al., "Local motion phases for learning multi-contact character movements." ACM Transactions on Graphics (TOG). Jul. 8, 2020;39(4):54-1 (Year: 2020).

Stomakhin et al., "Energetically Consistent Invertible Elasticity", Eurographics/ACM SIGRAPH Symposium on Computer Animation (2012), 9 pgs.

Thalmann et al., "Crowd rendering." Crowd Simulation. Springer London, 2013. 195-227.

Thalmann et al., "Modeling of Populations." Crowd Simulation. Springer London, 2013. 31-80.

Treuille, A. et al., "Near-optimal Character Animation with Continuous Control", University of Washington, 2007, 7 pgs.

Ulicny et al., "Crowd simulation for interactive virtual environments and VR training systems." Computer Animation and Simulation 2001 (2001 ): 163-170.

Vaillant et al., "Implicit Skinning: Real-Time Skin Deformation with Contact Modeling", (2013) ACM Transactions on Graphics, vol. 32 (n°4). pp. 1-11. ISSN 0730-0301, 12 pgs.

Vigueras et al. "A distributed visualization system for crowd simulations." Integrated Computer-Aided Engineering 18.4 (2011 ): 349-363.

Wu et al., "Goal-Directed Stepping with Momentum Control," Eurographics/ ACM SIGGRAPH Symposium on Computer Animation, 2010, 6 pages.

Zhang et al., "Mode-adaptive neural networks for quadruped motion control. ACM Transactions on Graphics (TOG)." Jul. 30, 2018;37(4): 1-1. (Year: 2018).

\* cited by examiner

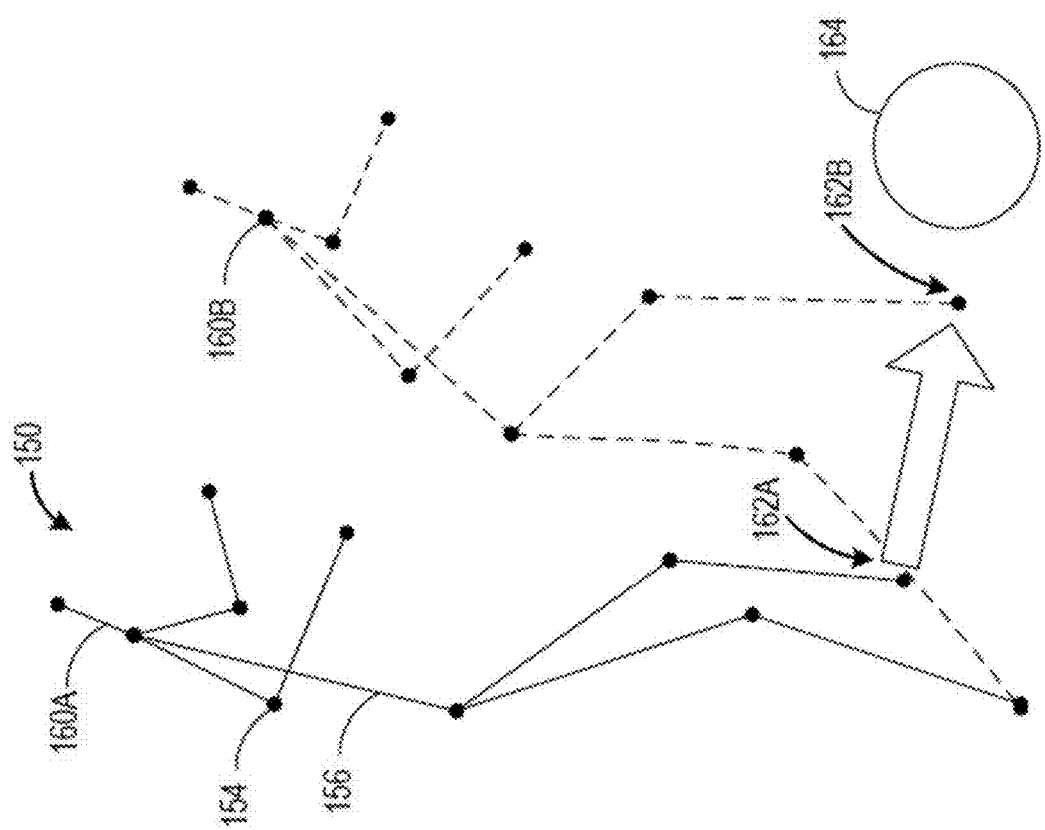

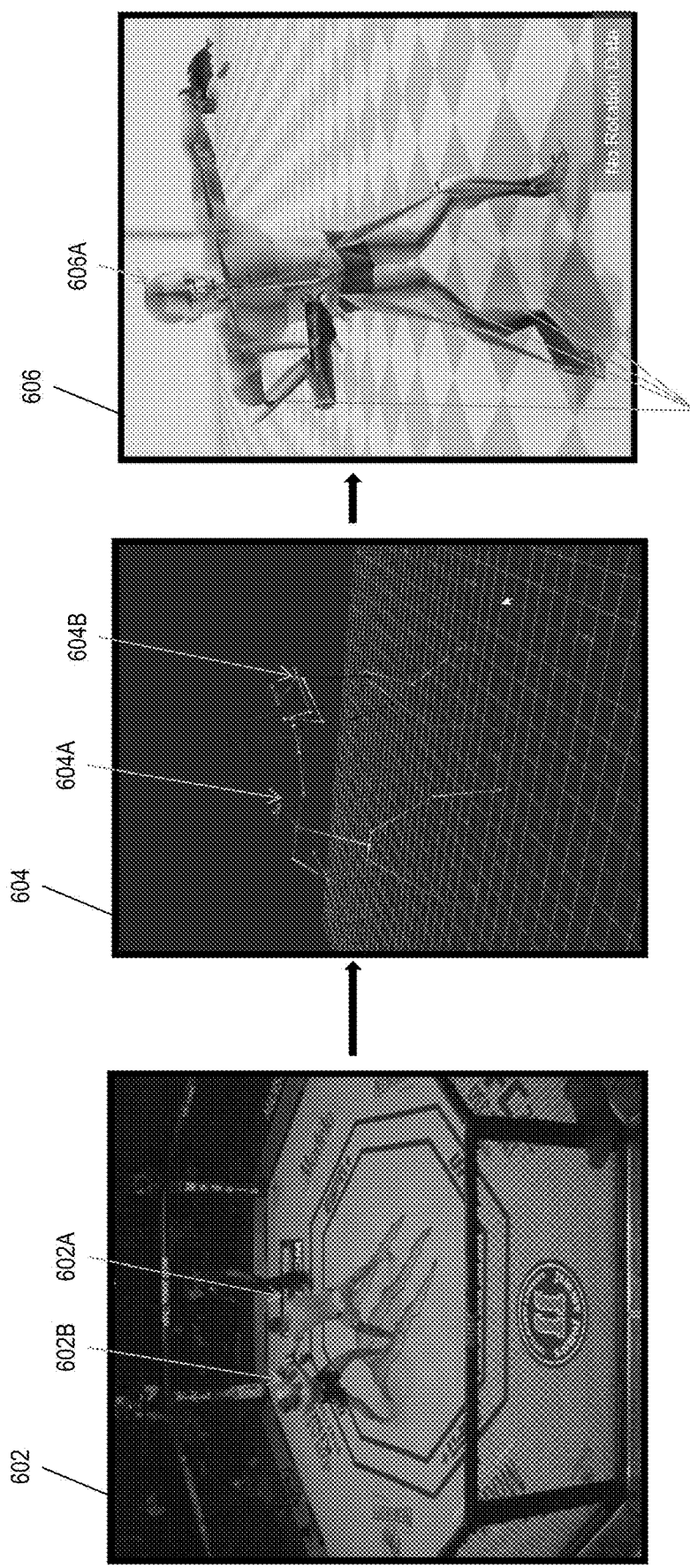

JOINT TWIST GENERATION FOR ANIMATION

BACKGROUND

Demand for ever increasing realism and detail in computer-implemented video games seems to drive the growth of computer performance. Unlike computer animation and movie rendering which can process individual scenes over time for playback at a higher frame rate, computer-implemented video games and computer-implemented simulators must render complete, three-dimensional (3D) scenes of a virtual game environment during runtime of the game application, typically at a rate of thirty (30) frames per second or better. It can be difficult to produce animations that appear lifelike, fluid, and realistic when rendering during runtime of the game application.

SUMMARY OF EMBODIMENTS

The systems, methods, and devices of this disclosure each have several innovative aspects, no single one of which is solely responsible for all of the desirable attributes disclosed herein.

One embodiment discloses a system at least one memory storing instructions and game application data; and at least one processor configured to execute the instructions to perform operations. The operations may include: execute an instance of a game application based in part on the game application data; generate a virtual game environment within the game application; determine a first pose of a first virtual character model within the virtual game environment, the first virtual character model comprising a virtual rig including a plurality of a rigid bodies connected by a plurality of joints, wherein the first pose is a first arrangement of the rigid bodies and joints of the virtual rig; receive an instruction to change the first pose of the first virtual character model based at least in part on the movement of a joint of the first virtual character model; obtain a set of axis vectors for the virtual rig of the first virtual character model; input the set of axis vectors to a twist model to generate a set of twist vectors; determine animation data based at least in part on the set of axis vectors and the set of twist vectors; determine an updated pose of first virtual character model based, at least in part, on the animation data; render the first virtual character model based, at least in part on the updated pose of the first virtual character model; and generate instructions to output a frame comprising at least a portion of the updated pose of the first virtual character model for a user display.

Another embodiment discloses a computer-implemented method. The method may include: executing an instance of a game application based in part on the game application data; generating a virtual game environment within the game application; determining a first pose of a first virtual character model within the virtual game environment, the first virtual character model comprising a virtual rig including a plurality of a rigid bodies connected by a plurality of joints, wherein the first pose is a first arrangement of the rigid bodies and joints of the virtual rig; receiving an instruction to change the first pose of the first virtual character model based at least in part on the movement of a joint of the first virtual character model; obtaining a set of axis vectors for the virtual rig of the first virtual character model; inputting the set of axis vectors to a twist model to generate a set of twist vectors; determining animation data based at least in part on the set of axis vectors and the set of twist vectors; determining an updated pose of first virtual character model based, at least in part, on the animation data; rendering the first virtual character model based, at least in part on the updated pose of the first virtual character model; and generating instructions to output a frame comprising at least a portion of the updated pose of the first virtual character model for a user display.

Another embodiment discloses a non-transitory computer-readable storage medium having stored thereon instructions that, when executed, direct a computing system to perform a method for rendering frames within a game application. The method may include: executing an instance of a game application based in part on the game application data; generating a virtual game environment within the game application; determining a first pose of a first virtual character model within the virtual game environment, the first virtual character model comprising a virtual rig including a plurality of a rigid bodies connected by a plurality of joints, wherein the first pose is a first arrangement of the rigid bodies and joints of the virtual rig; receiving an instruction to change the first pose of the first virtual character model based at least in part on the movement of a joint of the first virtual character model; obtaining a set of axis vectors for the virtual rig of the first virtual character model; inputting the set of axis vectors to a twist model to generate a set of twist vectors; determining animation data based at least in part on the set of axis vectors and the set of twist vectors; determining an updated pose of first virtual character model based, at least in part, on the animation data; rendering the first virtual character model based, at least in part on the updated pose of the first virtual character model; and generating instructions to output a frame comprising at least a portion of the updated pose of the first virtual character model for a user display.

In some embodiments, the animation data may define, in part, a skinned mesh for the rig.

In some embodiments, each axis vector of the set of axis vectors may point from a parent joint associated with the axis vector to a child joint of the parent joint.

In some embodiments, each twist vector of the set of twist vectors may be orthogonal to a respective axis vector of a same joint.

In some embodiments, the set of axis vectors may be based on position data of joints of the rig, and, to determine the animation data based on the set of axis vectors and the set of twist vectors, the operations further comprise: determining a set of rotation vectors for the joints by calculating, for each joint, a cross-product of a corresponding twist vector and a corresponding axis vector associated with the joint, the set of axis vectors, the set of twist vectors, and the set of rotation vectors comprising orientation data; and generating the animation data based on the position data and the orientation data.

In some embodiments, the twist model may be a neural network configured to predict the set of twist vectors based on the axis vectors.

In some embodiments, the rig may be a target rig, the neural network may be trained using a source rig, and the target rig may have a higher dimension of joints than the source rig.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements.

The drawings are provided to illustrate embodiments of the inventive subject matter described herein and not to limit the scope thereof.

FIG. 3 illustrates an embodiment of aspects of character models for use in a particle-based inverse kinematic process.

FIGS. 6A-6C illustrate examples of video data, motion capture data associated with video data, and an animation based thereon.

DETAILED DESCRIPTION OF EMBODIMENTS

Overview

Figure 1:
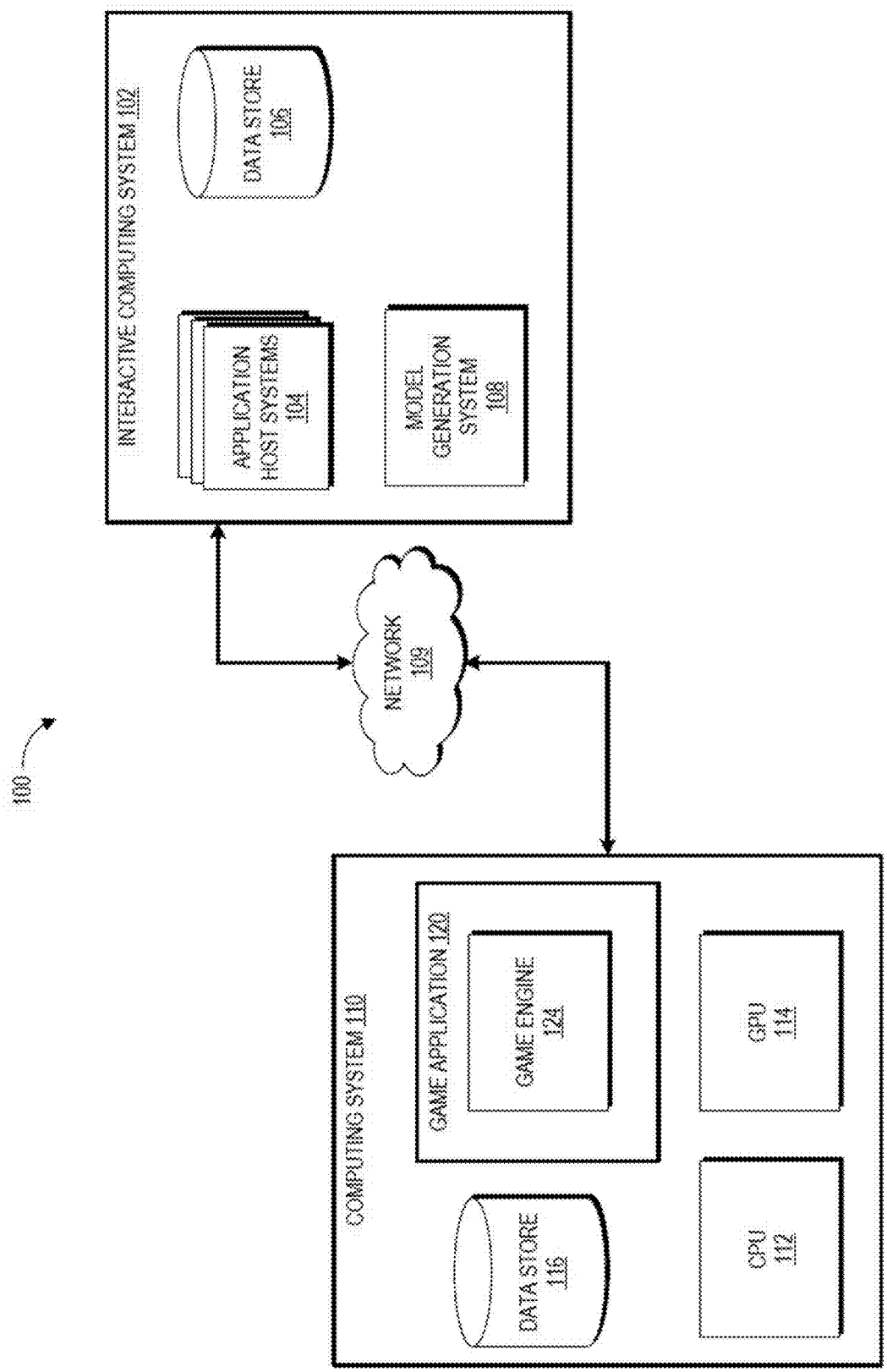
FIG. 1 illustrates an embodiment of a game system.

A video game application can use sequences of animations to help when rendering frames of the game application. The animations can be used when generating poses for character models or other virtual entities within a game environment. For example, when a character interacts with an object (such as, kicking a ball) or contacts another character, the game application can generate a series of poses of the character model performing the actions. As another example, when a character picks up an object or opens a door, the game may present a series of frames of the character performing the action. In some game applications, at least some of the poses of the character model may be created using motion capture technology. By using motion capture technology, more lifelike animations can be created as compared to other animation techniques.

An animated character can be modeled with a skeleton of rigid segments connected with joints, called a kinematic chain. During a video game, the game system determines a pose for the character at each frame, which includes positioning each joint and rigid segment of the character model. One methodology for generating the pose is to use an inverse kinematic animation system. An inverse kinematics problem can provide an expression that takes a position of an end-effector as input and gives joint positions for each joint in the character model as output. For example, the pose of the character model can be calculated based on the position of the foot when it strikes a ball within the game application. One of the problems associated with an inverse kinematic analysis is that there is a large range of freedom that is created by all of the different joints. Even with constraints, the kinematic chain of the character model is generally under constrained. By having an under constrained system, the iterative process for arriving at a solution using an inverse kinematic analysis can be extremely time consuming and costly to solve during runtime of the game application. Additionally, the system can arrive at any number of different solutions, many of which can result in poses that are not realistic or lifelike.

One solution is to animate character movement based on animation data determined, in part, by a neural network that helps to determine realistic and smooth movement. The neural network may output twist data for a set of joints (e.g., of a source rig) based on axis data for the set of joints. Generally, the axis data indicates (based on position data for the set of joints) a set of axis vectors. Each axis vector of the set of axis vectors point from a first joint to a second joint. For instance, each axis vector of the set of axis vectors is a direction that aligns a child joint and its parent. As an example, a parent joint may have one or multiple child joints, while each child may have exactly one parent joint. In some embodiments, each axis vector may point from a parent joint (associated with the axis vector) to a child joint of the parent joint, while in other embodiments, depending on a rig setup, each axis vector may point from the child joint to the parent joint. The twist data may include a set of twist vectors. Each twist vector of the set of twist vectors is orthogonal to a respective axis vector of a same joint. For each joint, using a twist vector and an axis vector associated with the joint, a rotation vector may be determined by calculating a cross-product thereof. Therefore, for each joint, a 6 degree of freedom set of data may be determined (3 cartesian positions, 3 orientations) and a skinned mesh of a character may be generated that is realistic and moves smoothly (e.g., does not change rapidly based on small changes in position). In this manner, systems and methods of the disclosure may help to generate smoother movement of a character by avoiding oscillations around joints and unnatural poses.

Although this disclosure focuses on videogames, it should be understood that embodiments described herein can be used with other types of software applications. For example, an educational application, a cartoon, a training application, a simulator, or a help guide within an application may each use one or more embodiments of the present disclosure. Characters can represent people, animals, creatures, cars, or any virtual entities within the game environment.

Overview of Game System Embodiments

FIG. 1 illustrates an embodiment of a computing environment for implementing one or more embodiments of a graphics processing system within a game application, such as a particle-based inverse kinematic system, also referred to as an IK analysis system or an IK system. The computing environment 100 can include a computing system 110 and an interactive computing system 102. The computing system 110 can execute a game application 120 which can host a game engine 122 and allow a player to play the game application 120.

The computing system 110 can communicate with the interactive computing system 102 via the network 140. The interactive computing system 102 can include a remote application 150 which can facilitate the execution of the game application 120 or provide one or more server side developer tools, a data store 106 configured to store information (such as graphics and computer code) associated with the game application 120 or model generation system 108, and application host systems 104 which can be configured to host at a portion of the game application 120. To simplify discussion and not to limit the present disclosure, FIG. 1 illustrates one computing system 110 and one interactive computing system 102, though multiple systems may be used.

Computing System

The computing system 110 can include a central processing unit (CPU) 112, a graphics processing unit (GPU) 114, and a data store 116. The computing system 110 may be implemented on a computing device such as the computing device 10 illustrated in FIG. 10. The computing system 110 may be in communication with the interactive computing system 102. For example, the interactive computing system 102 can communicate updates of the game application 120 to the computing system 110. The computing system 110 may use the CPU 112, the GPU 114, and the data store 116 to execute a game application 120. The game application 120 may be part of a game engine 118 which can include instructions causing the CPU 112 and/or the GPU 114 to execute at least a portion of the game application 120. The game application 120 can also implement a graphics processing system, such as the inverse kinematic processing system. The inverse kinematic processing system can be integrated into the game application (for example, such as incorporated into the game engine 122).

The computing system 110 may include hardware and software components for establishing communications over a communication network 109. For example, the computing system 110 may be equipped with networking equipment and network software applications (for example, a web browser) that facilitates communications via one or more networks (for example, the Internet or an intranet).

Game Application

The computing system 110 may execute a game application 120. The game application 120 may be an offline game which can be run locally on the computing system 110. The game application 120 may also be an online game which can involve communications among multiple computing systems. The computing system 110 can execute a game application 120 that may be stored and/or executed in a distributed environment. For example, the computing system 110 may execute a portion of a game and the interactive computing system 102, or an application host system 104 of the interactive computing system 120 may execute another portion of the game. For instance, the game may be a massively multiplayer online role-playing game (MMORPG) that includes a client portion executed by the computing system 110 and a server portion executed by one or more application host systems 104. For the present discussion, the game application 120 can include a distributed application or an application that includes a portion that executes on the computing system 110 and a portion that executes on at least one of the application host systems 104. Detailed elements of the game application 120 are further described with reference to the game system 200 in FIG. 2.

Game Engine

The game application 120 can include a game engine 122. The game engine 122 can be loaded into the memory on the computing system 110 and can act as an interface or hub for one or more game applications 120 that interfaces with the application host systems 104.

The game engine 122 can be configured to execute aspects of the operation of the game application 120 according to game rules. Examples of game rules can include rules for scoring, possible inputs, actions/events, movement in response to inputs, and the like. Other components can control what inputs are accepted and how the game progresses, and other aspects of gameplay. The game engine 122 can receive the user inputs and determine in-game events, such as actions, jumps, runs, throws, attacks, and other events appropriate for the game application 120. During runtime operation, the game engine 122 can read user inputs, in-game data, and game state information to determine the appropriate in-game events. Additional examples of the game engine are further described in FIG. 2.

Data Store

The computing system 110 can include a data store 116. The data store 116 can be configured to store data that may be generated or used by the computing system 110. For example, the data store 116 may store instructions for executing the game application 120 and game engine 122.

Interactive Computing System

The interactive computing system 102 may include a model generation system 108, application host systems 104, and a data store 106. The interactive computing system 102 may be part of the computing device 10 in FIG. 10. A game developer may use the interactive computing system 102 to customize various features of the game application 120.

Application Host Systems

As described with reference to the computing system 110, the application host systems 104 can host at least a portion of the game application 120. The application host systems 104 can be configured to execute a portion of the game application 120 and/or game engine 122. In certain embodiments, instead of or in addition to executing a portion of the game application 120 and/or game engine 122, the application host systems 104 may execute another application, which may complement and/or interact with the game application 120 during the execution of an instance of the game application 120.

The interactive computing system 102 may enable multiple players or computing systems to access a portion of the game application 120 and/or game engine 122 executed or hosted by the interactive computing system 102. In some embodiments, the portion of the game application 120 executed by application host systems 104 of the interactive computing system 102 may create a persistent virtual world. This persistent virtual world may enable one or more players to interact with the virtual world and with each other in a synchronous and/or asynchronous manner. In some embodiments, the application host systems 104 may execute a hosting system for executing various aspects of a game environment. For example, in one embodiment, the game application 120 may be a competitive game, such as a first person shooter or sports game, and the application host systems 104 can provide a dedicated hosting service for hosting multiplayer game instances or facilitate the creation of game instances hosted by player computing devices. In some embodiments, the application host systems 104 can provide a lobby or other environment for players to virtually interact with one another. Such environments may include environments for conducting transactions between players, such as an auction house or type of environment for facilitating transactions.

Model Generation System

The model generation system 108 can use one or more machine learning algorithms to generate one or more deep neural networks, prediction models, or parameter functions. One or more of these parameter functions may be used to determine an expected value or occurrence based on a set of inputs. For example, a prediction model can be used to generate an estimated pose for a character model in a video game 120 based on one or more inputs to the prediction model, such as, for example, the positions of one or more joints within the character model. A number of different types of algorithms may be used by the model generation system 108. For example, certain embodiments herein may use a fully connected deep neural network. However, other models are possible, such as a logistical regression model, a linear regression model, a discrete choice model, or a generalized linear model.

The machine learning algorithms can be configured to adaptively develop and update the models over time based on new input received by the model generation system 108. For example, the models can be regenerated on a periodic basis of new motion capture data available to help keep the model more accurate. The model generation system 108 is described in more detail herein. After a model is generated, such as a deep neural network, it can be provided to the game engine 122 to facilitate the generation of poses during runtime of the game application.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

Data Store

The data store 106 can store information associated with the game application, such as a virtual environment of the game application 120, game rules, model data for the model generation system 108, as well as assets in the game application 120, such as graphical appearances and animations of game characters.

Example Embodiment of a Game System

Figure 2:
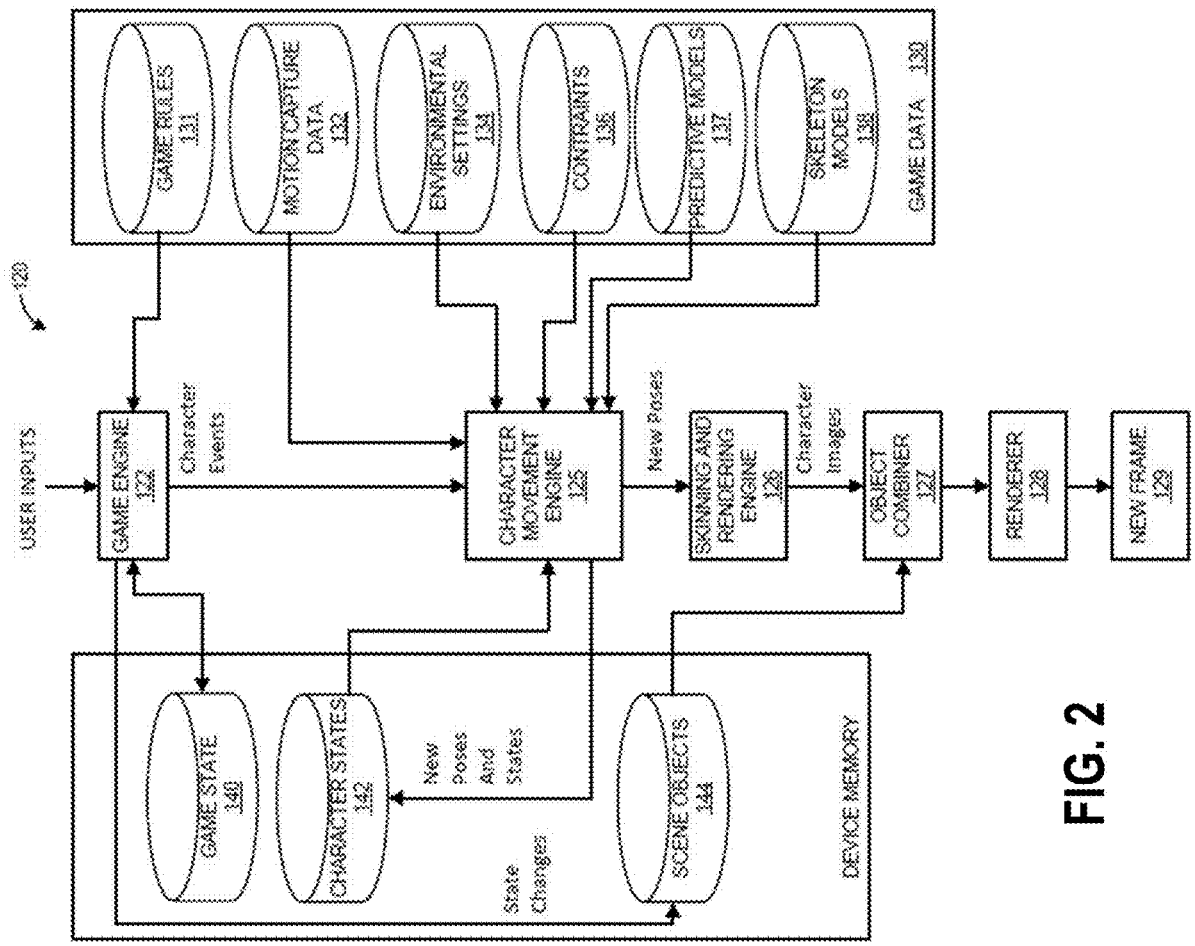
FIG. 2 illustrates an embodiment of elements of a game system.

FIG. 2 illustrates an embodiment of components of a game application system 100 for generating, rendering, and outputting frames for display during operation of the game application. The game application system 120 receives user inputs and generates commands configured to output video and audio data. The computing system 110 and/or display can provide the corresponding video and audio output to the user. During operation of a game application, the output video data is generated as a series of frames. Preferably, the game application is capable of generating frames at a rate that does not diminish the gameplay experience for the user (for example, at least 30 frames per second).

In one embodiment, a game engine 120 receives the user inputs and determines character events, such as actions, collisions, runs, throws, attacks and other events appropriate for the game. The character events are conveyed to a character movement engine 125 that determines the appropriate motions the characters and determines new poses for the characters and provides those new poses to a skinning and rendering engine 126, which in turn provides character images to an object combiner 127 to combine animate, inanimate and background objects into a full scene. The full scene is conveyed to a renderer 128, which generates a new frame 129 therefrom.

Game code/data 130 is shown comprising game rules 131, prerecorded motion capture poses/paths 132, environmental settings 134, constraints 136 (such as strength and velocity constraints), and skeleton models 138. The device executing the game might have memory 106 for game state 140, character states 142 and scene object storage 144. Character states 142 can comprise storage for a current pose of characters being animated.

During operation, the game engine 122 reads in game rules 131 and considers game state 140 to arrive at character events. Character movement engine 125 reads in data from a motion capture data repository 132 as well as character states 142. The motion capture data repository 132 can store motion capture video and/or motion capture images that may be used to generate procedural animation.

The character movement engine 125 can use skeleton models 138, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 125 might also introduce character movements for randomness, personality, and so forth. FIG. 3 provides an example embodiment of simplified skeletal models for purposes of illustrating the concepts and processes disclosed herein.

The character movement engine 125 can also include inputs from the environmental settings 134, character states 142 such as current poses (for example, positions of body parts expressed as positions, joint angles or other specifications), and velocities (linear and/or angular) of body parts and motions, which can be in the form of a set of force/torque vectors for some or all body parts, and prediction models 137. From this information, the character movement engine 125 generates new poses for the characters using rules of physics, and those new poses can be used to update character states 142 and are also provided to rendering engine 126. Where invisible skeleton models are used, character states 142 might contain current position of visible "graphics" of characters as well as the invisible rag-doll skeleton characters.

The skinning and rendering engine 126 takes into account the surfaces, colors and textures of the body parts of posed characters and renders character images. Object combiner 127 can then combine the character images with inanimate and background objects obtained from scene objects store 144 to provide a complete scene to renderer 128.

In some embodiments, the character movement engine 125 can implement an animation system. The character movement engine 125 may generate a pose for a character model in response to, for example, a character event. The pose may be generated on a frame-by-frame basis and can be based at least in part on animation data generated (offline or in real time) by the animation system using one or more prediction models of the prediction model repository 137. For example, a prediction model may be a deep neural network associated with a portion of the joints of character model. The character movement engine 125 can use the animation data and other rules and constraints associated with the character model in order to generate the pose. The pose can be provided to the skinning and rendering engine 126 for rendering of the character model within the game environment. The pose may be used for a subsequent frame, and the process of generating a new pose may be repeated.

Advantageously, in certain embodiments, using the prediction model to generate the animation data enables more fluid procedural animation compared to pre-existing processes and avoids sudden oscillations around singularities and unnatural poses. In certain embodiments, one or more of the game application 120, the game engine 122, or the character movement engine 125, the interactive computing system 102, and the model generation system 108, among other systems may be configured to execute the processes discussed herein.

Character Model Embodiments

FIG. 3 illustrates an embodiment of positions of a character model 150. The character model 150 can be movable and is illustrated in a first pose 160A and a second pose 160B. The character model 150 can include a mesh (not shown) and the illustrated skeleton frame, which includes a plurality of elements, such as joints 154 and rigid bodies 156. The character model 150 can be referred to as a rig. The illustrated character model 150 has been simplified for clarity. A character model 150 for use within a game application may include any number of joints, members, meshes, and data that can be used to represent a character or entity within a game environment.

In the illustrated embodiment, the character 150 moves from the first pose 160A to the second pose 160B based on the movement of an end-effector joint (such as, a foot) from the first position 162A to the second position 162B in order to engage the object 164 (such as a soccer ball). The system can perform an inverse kinematic analysis for movement of the positions of the joints and rigid segments of the character model 150 based on the placement of the end-effector in the second position 162B. The system can generate the second pose 160B for character model based on a particle-based inverse kinematic analysis. An example of the inverse kinematic analysis is described in further detail with respect to FIGS. 4A-4D.

Examples Embodiments of a Particle-Based Inverse Kinematic Analysis

Figure 4A:
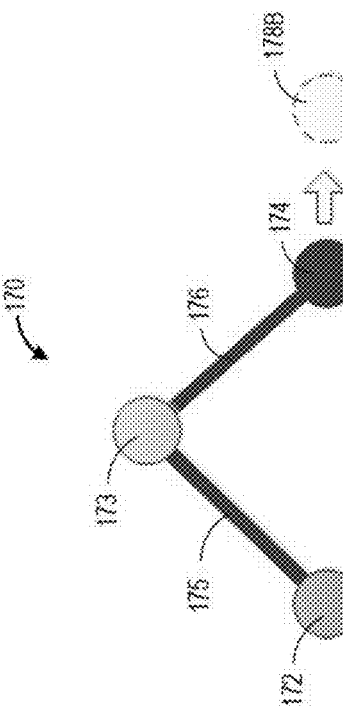
FIGS. 4A-4D illustrate aspects of a particle-based inverse kinematic process.
Figure 4B:
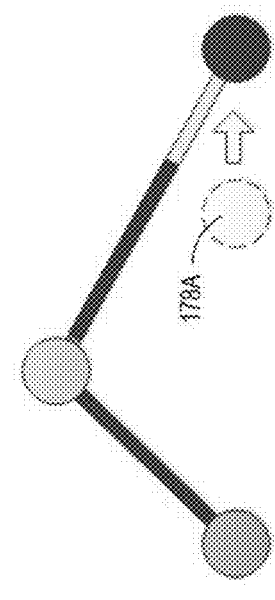

FIGS. 4A-4D illustrate aspects of a particle-based inverse kinematic analysis. FIGS. 4A through 4D illustrate a simplified example of a subset of elements of a character model 170 for an inverse kinematic analysis. The character model 170 includes a plurality of joints 172, 173, 174 and connectors 175, 176. The end-effector joint 174 moves from the first position 178A to the second position 178B as illustrated in FIG. 4B. FIG. 4B illustrates the end-effector joint 174 in the second position 178B. In order to move 174 to the second position 178B the connector 176 would have to be extended. Each connector is a rigid body and the system performs an inverse kinematic analysis in order to determine a solution. Each connector and joint can be defined accordingly to a series of rules and/or constraints. The rules and/or constraints govern how the connectors and joints can be moved and manipulated within the character model 170 and within the game application 120.

In order to compensate for the extension of the connector 176 the other joints and connectors need to be moved in accordance with the defined constraints. The IK system can iteratively solve the problem in order to arrive at the final position of each element of the character model 170, as illustrated in FIG. 4D. However, as discussed above, even with constraints, the kinematic chain of the character model is generally under constrained. By having an under constrained system, the iterative process for arriving at a solution using an inverse kinematic analysis can be extremely time consuming. Additionally, even with the constraints, the resulting poses and animations can look less life-like and take on a rubbery appearance.

Figure 4C:
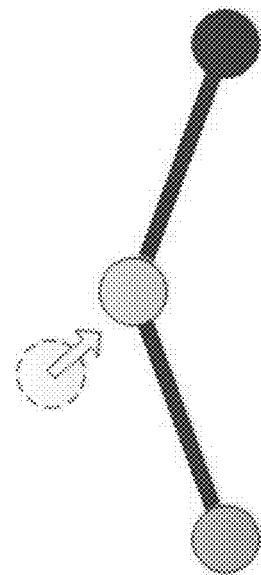
Figure 4D:
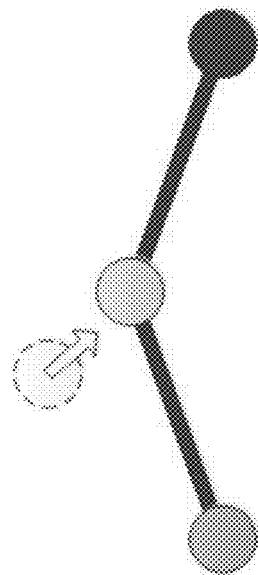

In order to reduce the computation time and/or generate more realistic poses, the IK system can generate an estimated pose for the model, such as illustrated in FIG. 4C. In FIG. 4C, joint 173 moves to predictive position 178C. The predictive pose can be calculated based on a set of rules that define how a joint moves based on the movement of another joint. For a simple model, the rules can be easy to generate. However, as the complexity of the model increases, the number of rules and constraints can be difficult to generate for every situation. The predictive pose can be an approximation of the final position of an element. The predictive pose can help to significantly reduce the computation time of the final pose by reducing the amount of movement required by the model in order to arrive in the final position. Additionally, the predictive pose can be helpful in better approximating realistic poses.

Figure 5:
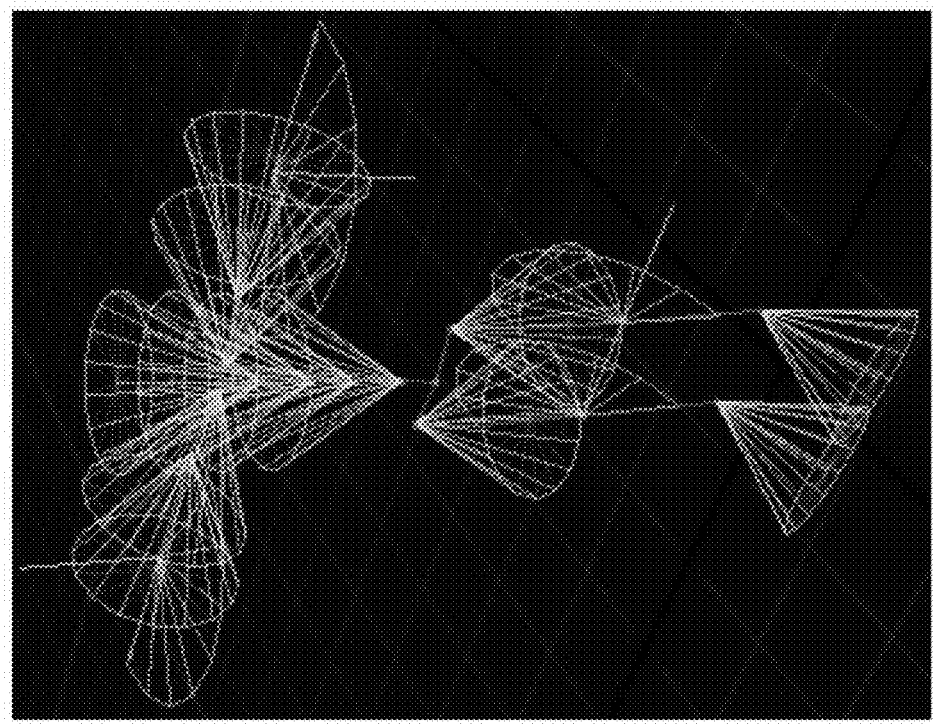
FIG. 5 provides an example embodiment of angle constraints of a character model.

FIG. 5 illustrates an example embodiment illustrating aspects of constraints of a node of a character model. FIG. 5 illustrates an example embodiment 180 of constraints for joints and connectors within a character model. In FIG. 5 each of the coned areas represent degrees of freedom or degrees of movement associated with each of the joints within the character model, which can also be referred to as a joint hierarchy or joint network 180. As illustrated, each joint can have a defined range of movement. A joint can be coupled with one or more connectors. Generally, the connectors are rigid segments that are a defined length. As characters move within these degrees of freedom one of the problems that presents itself is the large range of freedom that is created by all of the different joints. By having so many degrees of freedom, even with the existing constraints, the model is usually under constrained. In order to reduce the degrees of freedom associated with each of the joints, the IK system can use machine learning to limit the angle constraints associated with each joint.

Joint Twist Generation for Robust Animation Retargeting

In one aspect of the disclosure, animation of character movement is based on animation data determined, in part, by a neural network that determines realistic and smooth movement. The neural network may output twist data for a set of joints (e.g., of a source rig) based on axis data for the set of joints. Generally, the axis data indicates (based on position data for the set of joints) a set of axis vectors. Each axis vector of the set of axis vectors point from a first joint to a second joint. For instance, each axis vector of the set of axis vectors is a direction that aligns a child joint and its parent. As an example, a parent joint may have one or multiple child joints, while each child may have exactly one parent joint. As used herein, each axis vector may point from a parent joint (associated with the axis vector) to a child joint of the parent joint, but one of skill in the art would recognize that, alternatively depending on a rig setup, the axis vector may point from the child joint to the parent joint. Therefore, in the remainder of the disclosure, the example of an axis vector pointing from a parent to a child joint is described, but the techniques of the disclosure apply to other rig setups. The twist data may include a set of twist vectors. Each twist vector of the set of twist vectors is orthogonal to a respective axis vector of a same joint. For each joint, using a twist vector and an axis vector associated with the joint, a rotation vector may be determined (e.g., by taking a cross-product thereof). Therefore, for each joint, a 6 degree of freedom set of data may be determined (3 cartesian positions, 3 orientations) and a skinned mesh of a character may be generated that is realistic and moves smoothly (e.g., does not change rapidly based on small changes in position). In this manner, systems and methods of the disclosure may determine smooth movement of a character by avoiding oscillations around joints and unnatural poses.

FIGS. 6A-6C illustrate examples of video data 602, motion capture data 604 associated with the video data 602, and an animation 606 based the motion capture data 604. The video data 602 and the motion capture data 604 may be based on video of real-world events (e.g., video of actors, professional sports players, etc.). Additionally or alternatively, the video data 602 and the motion capture data 604 may be based on animations (e.g., video of an animation, etc.). When extracting 3D motion from the video data 602, generally only position data of a skeleton may be reliably estimated. The position data may indicate, for each joint of a rig, position of a joint, distance between associated joints, etc. The motion capture data 604 may reflect the position data of a rig corresponding to the skeleton from video data 602. The animation 606 may be based on the motion capture data 604 with no rotation data for each character joint. In this case, skinned mesh data does not accurately reflect the skeletal motion. As depicted in animation 606, the skinned mesh data may not look realistic.

As an example, the video data 602 includes two subjects 602A and 602B and the motion capture data 604 includes position data 604A and 604B of respective rigs of the two subjects 602A and 602B, as estimated. In the animation 606, a subject 606A (corresponding to, e.g., the subject 602A with the position data 604A) may have a skinned mesh 606B that does not look realistic because each joint is not properly rotated.

Figure 7A:
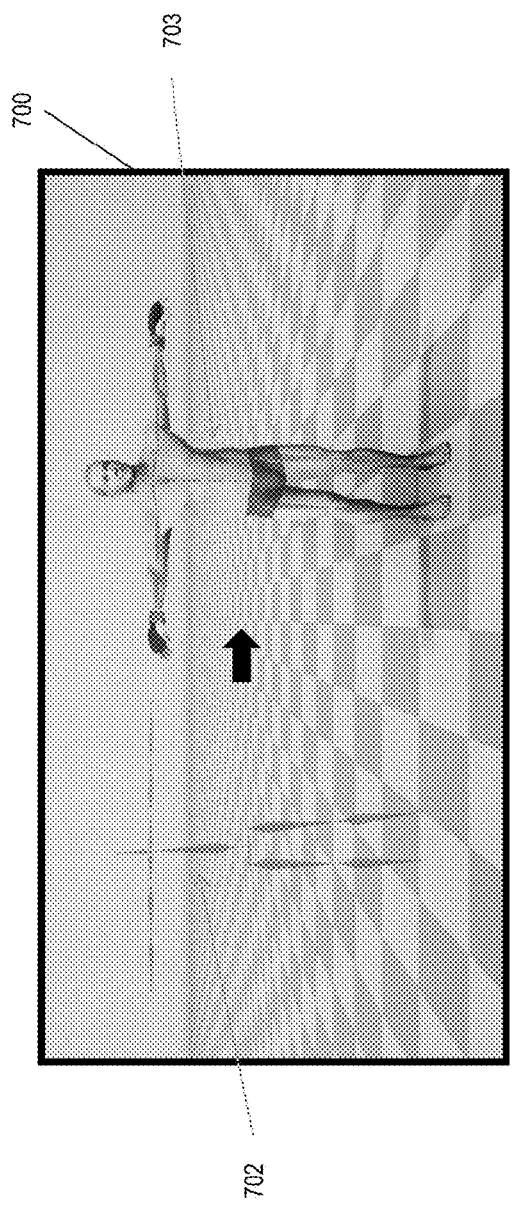
FIGS. 7A-7B illustrate examples of a rig-mesh representation of a character and IK system artifacts animation versus desired twist rotations animation.
Figure 7B:
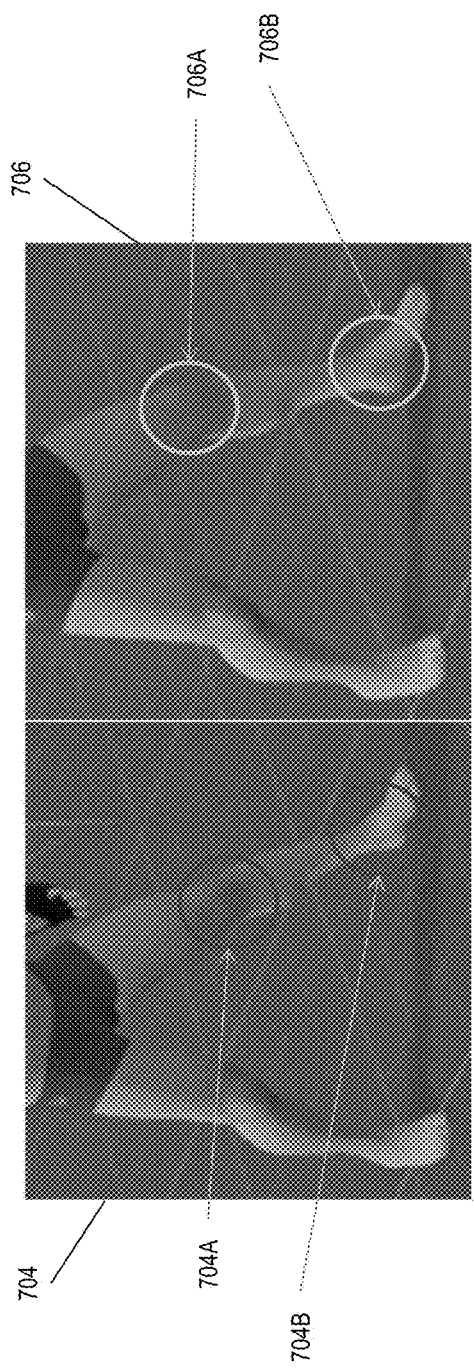

FIG. 7A illustrates an example of representations 700 of a source rig 702 and target rig-mesh of a character 703. FIG. 7B illustrates an example of IK system artifacts animation 704 versus desired twist rotations animation 706. The representation 700 may have a source rig 702 and a target rig with a skinned mesh 703. As illustrated, the source rig and the target rig can have different dimensionally (e.g., the target rig has additional spine joints) To address the lack of rotation data from the motion capture data as discussed above, heuristic methods (such as using IK systems) are typically used, but which can only achieve semi-realistic results. Moreover, when retargeting between different character joint topologies and hierarchies, traditional methods (e.g., IK systems) may be heavily limited. Further, when retargeting motion and estimating rotations via IK systems, sudden oscillations around singularities (e.g., joints) and unnatural poses may be frequent. For instance, this may be because IK systems tend to overfit data. In addition, when estimating additional joints (e.g., spine joints) in a target rig not present in a source rig, the results may need to be artificially generated.

As an example, when using IK systems to estimate rotations for the rig 702 with the skinned mesh 703, the IK system may generate IK system artifacts 704A and 704B, as displayed in the IK system artifacts animation 704. For instance, the IK system artifacts 704A and 704B may oscillate around a joint, where estimated rotation data may change substantially based on small changes in position of the joint (in this case, a knee joint), thereby presenting an unnatural (e.g., unrealistic) appearance. The desired twist rotations 706A and 706B, as displayed in the desired twist rotations 706, may illustrate what the skinned mesh 703 should appear as using more realistic rotation data for the joints.

Figure 8A:
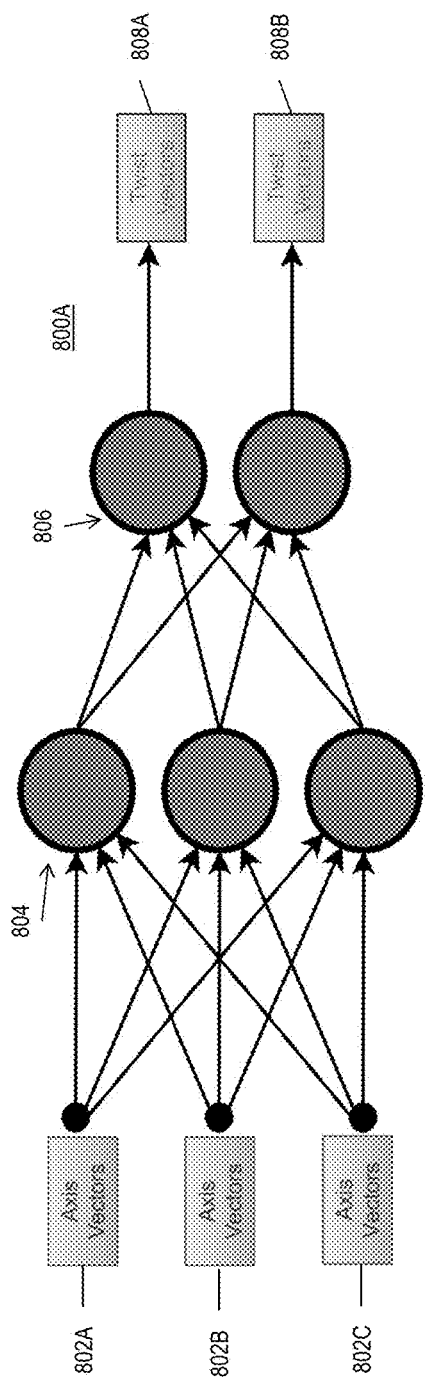
FIGS. 8A-8C illustrate a neural network with training set and explanatory diagram.
Figure 8C:
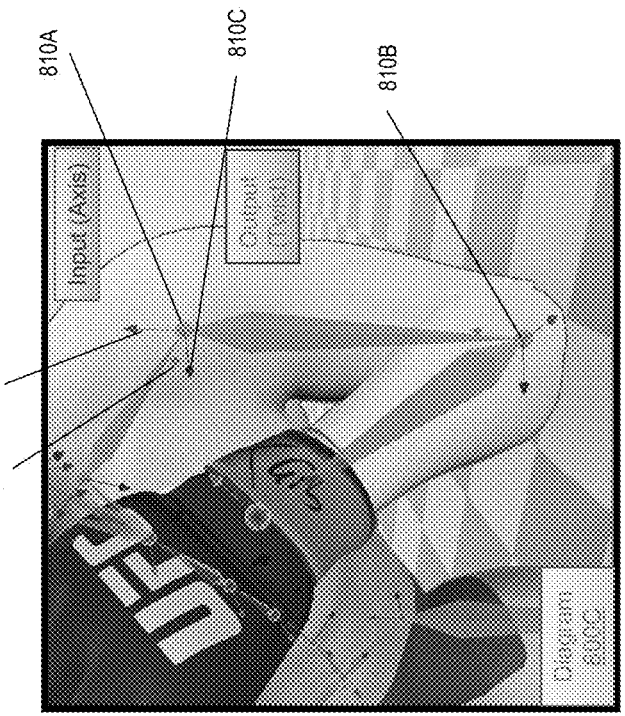
Figure 8B:
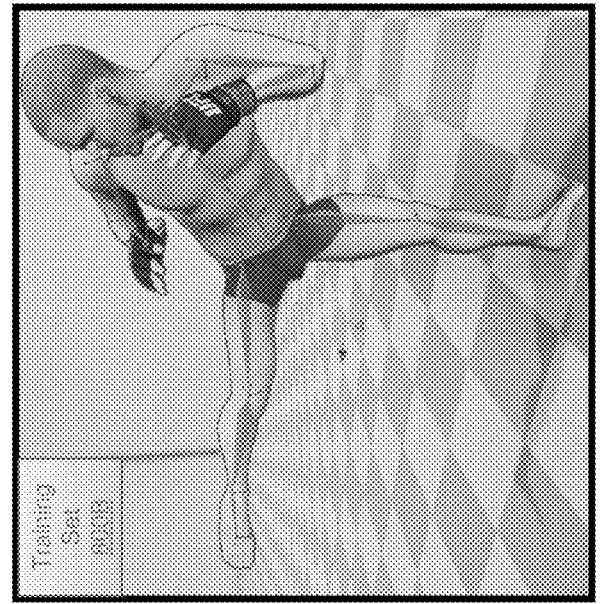

FIGS. 8A-8C illustrate a neural network 800A with training set data 800B and explanatory diagram 800C. In particular, the neural network 800A (referred to as "twist model" herein) may determine realistic and smooth movement. The neural network may output twist data for a set of joints of a source rig based on axis data for the set of joints. As discussed above, the axis data indicates (based on position data for the set of joints) a set of axis vectors. Each axis vector of the set of axis vectors point from a parent joint (associated with the axis vector) to a child joint of the parent joint. The twist data may include a set of twist vectors. Each twist vector of the set of twist vectors is orthogonal to a respective axis vector of a same joint. For each joint, using a twist vector and an axis vector associated with the joint, a rotation vector may be determined (e.g., by taking a cross-product thereof). Therefore, for each joint, a 6 degree of freedom set of data may be determined (3 cartesian positions, 3 orientations) and a skinned mesh of a character may be generated that is realistic and moves smoothly (e.g., does not change rapidly based on small changes in position). In this manner, systems and methods of the disclosure may determine smooth movement of a character by avoiding oscillations around joints and unnatural poses.

For instance, turning to the explanatory diagram 800C in FIG. 8C, a shoulder joint 810A (referred to as parent joint) is depicted as a representative joint. The shoulder joint 810A may be a parent joint to an elbow joint 810B (referred to as child joint in this context; which may also be a parent joint to a separate joint, such as the wrist joint). Based on position data of the shoulder joint 810A and the position of the elbow joint 810B, an axis vector 810C may be determined that points from the parent to a child. As discussed below, the neural network 800A may output a twist vector 810C for the shoulder joint 810A. Using the axis vector 810A and the twist vector 810C for the shoulder joint 810, a rotation vector 810E for the shoulder joint 810 may be determined. As one of skill in the art would recognize, a rig (e.g., rig 702) may define relationships between a set of joints, such as hierarchical relationships where certain joints may be a parent joint to a child joint.

Turning to the neural network 800A in FIG. 8A, the neural network 800A can be a deep neural network. FIG. 8A illustrates an example of a fully connected deep neural network (DNN). The illustrated neural network 800A may have an input layer 804 and an output layer 806, with none, one, or more hidden layers (not depicted) of nodes. The input layer 804 may take as input a plurality of axis vectors 804A of a rig. The output layer 806 may output a plurality of twist vectors of the rig. For instance, the input layer 804 may take as input a plurality of axis vectors 804A for a set of parent joints of a rig. The output layer 806 may output a plurality of twist vectors for the set of parent joints of the rig. The illustrated embodiment provides twist vectors for the parent joints based on the input axis vectors. The nodes may define how the twist of more the joints respond or influence twist/movement of other joints within the character model. For example, when the knee is bent in one way then the ankle will generally bend in a specific way with a certain twist vector.

The neural network 800A can be associated with a defined network of joints within the character model (e.g., all invariant joints in a single neural network, or separate neural networks for sets of joints for a spine, arms, legs, etc.). Nodes of the neural network 800A may generally include an activation function and define a set of weights and biases. Multiple DNNs can be generated based on the type of model and requirements of the system. Each DNN can be a fully connected neural network with a number of hidden layers which is specific to each system and each can have defined inputs joints that drive defined output joints. In some embodiments, an input for one DNN may be dependent on the output from another DNN. For instance, in the case that a source rig used for generation of the DNN has a set of joints less than a target rig (e.g., in a spine), the output associated with an invariant joint may be used to determine input for an intermediate joint. Details are further discussed herein. The resultant output of the (at least one) neural network 800A can be used to generate the animation data. The animation data may include the position data along with the rotation data (e.g., twist and rotation vectors, where an axis vector is defined) for each joint of the target rig.

To train the (at least one) neural network 800A, the training set 800B may include position data of rigs with expected rotation data. In this way, the training set 800B may provide loss feedback via loss functions when the in-training neural network 800A deviates from expected rotation data of the training set 800A. For instance, the position data of the rigs may be used to determine axis vectors of the rigs, which may be used to generate features vectors. The feature vectors may be input to the in-training neural network 800A, which outputs predicted twist vectors. Together with the axis vectors and twist vectors (e.g., to determine rotation vectors, and thus rotation data), the loss functions may determine adjustments to nodes of the in-training neural network 800A based on differences in the expected rotation data and the rotation data of the in-training neural network 800A. In some embodiments, the rigs of the training data may include more joints than the invariant joints of the source rig. In this manner, using a source model (having a set of invariant joints (e.g., shoulder, arm, wrist, hand, etc., as a set of joints) with training data that has a higher dimension of joints (e.g., invariant joints of source model plus additional intermediate joints) of the source model, may still be used to generate smooth movement of a target rig. Generally, the training set 800B incudes known examples of realistic motion. For instance, the training set 800B may include position data from the video data 602 and the motion capture data 604, discussed above. The motion capture data 604 may provide the position data to create feature vectors for training.

After the neural network 800A has been trained, position data of a character, received during runtime of the game application, may be processed to generate twist and rotation data for use in generating a more realistic render of the character. For instance, an output of the neural network 800A may be used to update animation data to include rotation data along with the position data of the joints. In this manner, the systems and methods of the disclosure may generate realistic movement of a character, as a part of the character movement engine 125. For instance, as an example, the system may receive kick position data (per frame); the neural network 800A may determine rotation data (per frame) for the kick position data; and generate animation data (per frame) using the position data and the rotation data for a kick animation. One of skill in the art would recognize that various actions may be processed and the specific action (e.g., kick) is not intended to be limiting.

In some embodiments, when the target rig has a higher dimension of joints (e.g., more than the invariant number of joints of the source rig), for intermediate joints, the system may predict position and rotation of the intermediate joints between two invariant joints. For instance, starting from a first invariant joint to a second invariant joint with one or more intermediate joints therebetween (e.g., in a spine), the system may recursively determine a position of a child and a rotation thereof, for each subsequent intermediate joint. For instance, the system may determine a position of a child based on a rotation of parent (e.g., the first invariant parent to the first child, the first child to the second child, etc.); determine an axis vector therebetween (e.g., parent position is known and child position is known); determine a twist vector based on the axis vector (e.g., by inputting to the neural network 800A); determine a rotation vector based on the axis vector and twist vector (e.g., take cross-product of twist and axis vector); and determine a next position of a child (if any, by repeating the above sequence). If the next joint is the second invariant joint, the system may determine whether an error accumulation exceeds threshold from known positions of invariant joints, and adjust a rotation of first invariant joint to a first intermediate joint to align intermediate joints at the second invariant joint.

At run-time, character joint position data and rotation data of the current pose can be provided in accordance with animation data for a given action. The character joint position data for a subsequent pose may be predicted using a prediction model and the neural network may predict twist vectors (based on axis vectors) to determine rotation vectors. In this manner, the game engine 124 may render realistic and smooth movement of the rig and the skinned mesh for a pose for a character model in a video game 120.

One benefit of techniques of the present disclosure is that the techniques are independent of proportions of character, as the neural network 800A is concerned with axis vectors and twist vectors and not position data of joints (where relative size of character could limit applicability). Therefore, if a source rig and a target rig have a general physiological logical relationship (e.g., bi-pedal movement), the trained neural network may be applicable to a wide range of domains, beyond a given training set.

Therefore, systems and methods of the present disclosure may generate more realistic movement of game characters. For instance, a 3DOF (three degrees of freedom) connection axis may be reconstructed from position data of joints, and by learning the 3DOF twist axis from motion data, realistic joint rotations can be generated for a large range of unseen character movements in a robust manner. In addition, 6DOF (six degrees of freedom) joint rotations may be predicted for intermediate joints (of target rigs that have more than the invariant set of the source rig), thereby extending applicability to multiple types of rigs, as long as the rigs share a general physiological logical relationship. Furthermore, motion of the knee and elbow joints may be continuous over multiple frames, and do not result in oscillations or joint limit violations, but appear natural. This result may be obtained by projecting solutions onto a full-body human motion manifold (e.g., of the training data), as the training data may include actual human movement (e.g., from video of real-world events).

Moreover, the systems and methods of the present disclosure may generate realistic and smooth movement without incurring high computational costs, as the generating of twist rotations for a character rig is accomplished from a position-only input (e.g., the axis vectors) without the iterative IK system process to determine rotation data. Further, the neural network 800A is transferable from original training sets to other domains (e.g., fighting to soccer or basketball).

Figure 9:
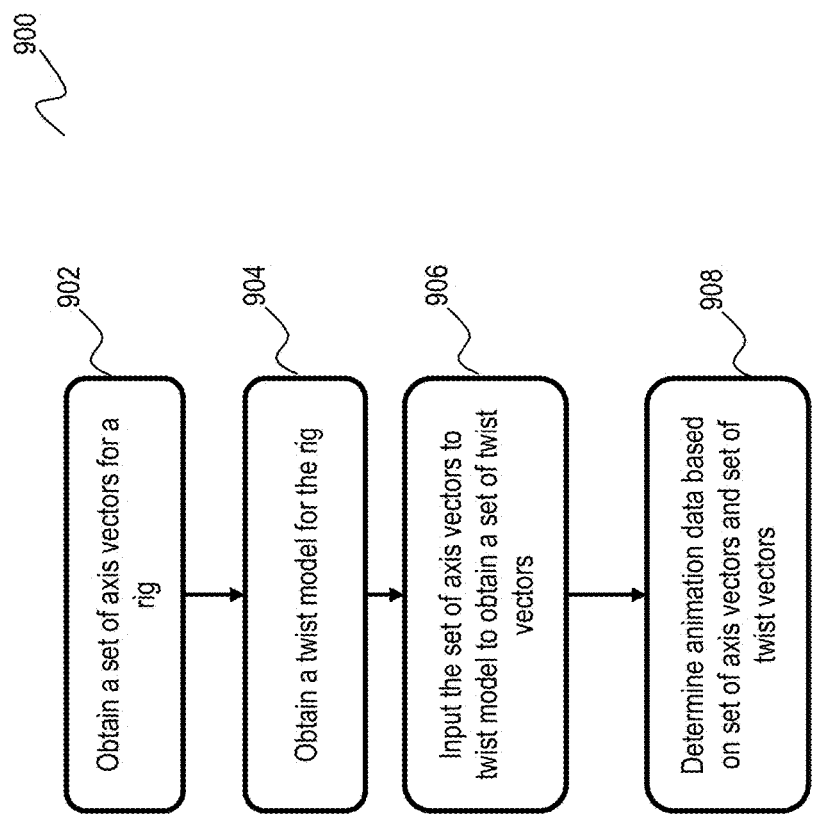
FIG. 9 presents a flowchart of an embodiment of a process 900 for determining animation data.

FIG. 9 presents a flowchart of an embodiment of a process 900 for determining animation data. The process 900 can be implemented by any system that execute and render a video game application. The process 900, in whole or in part, can be implemented by, for example, by one or more systems, such as, for example, by the character movement engine 125, the game engine 122, the game application 120, the user computing system 110, the interactive computing system 102, among others. Although any number of systems, in whole or in part, can implement the process 900, to simplify discussion of process 900 will be described with respect to particular systems. Further, the process 900, or particular operations of the process 900 may be performed continuously or repeatedly during runtime for a video game 120 until a condition is reached or a user stops execution of the game application. For example, the process 900 may be configured to repeat for each character model being rendered within the game application. In some embodiments, the process may be utilized for only a subset of the characters being rendered by the game application.

At block 902, the system can obtain a set of axis vectors for a rig. The system can obtain position data for a character in a game or a subject of a video (e.g., animation). The position data indicating positions of joints of the character rig. The system may determine axis vectors between respective joints of the rig, (e.g., for each parent-child relationship of the rig), as discussed herein.

At block 904, the system can obtain a twist model for the rig. For instance, the system can retrieve the twist model from one or more predictive models 137, e.g., based on a determination that this character or subject has a same general physiological logical relationship, as discussed herein.

At block 906, the system can input the set of axis vectors to the twist model to obtain a set of twist vectors. For instance, the twist model may be the trained neural network 800A, as discussed herein, which may predict the set of twist vectors based on the set of axis vectors.

At block 908, the system can determine animation data based on the set of axis vectors and the set of twist vectors. For instance, the system can generate a 6DOF model of the character, as discussed herein. For instance, the 6DOF model of the character may use the position data (e.g., 3 cartesian positions) of each joint and rotation data of each joint based on a cross-product of each axis vector and twist vector (3 orientation vectors), as discussed herein. The animation data may be used to render a skinned mesh in a realistic and smooth manner (e.g., across frames).

Overview of Computing Device

Figure 10:
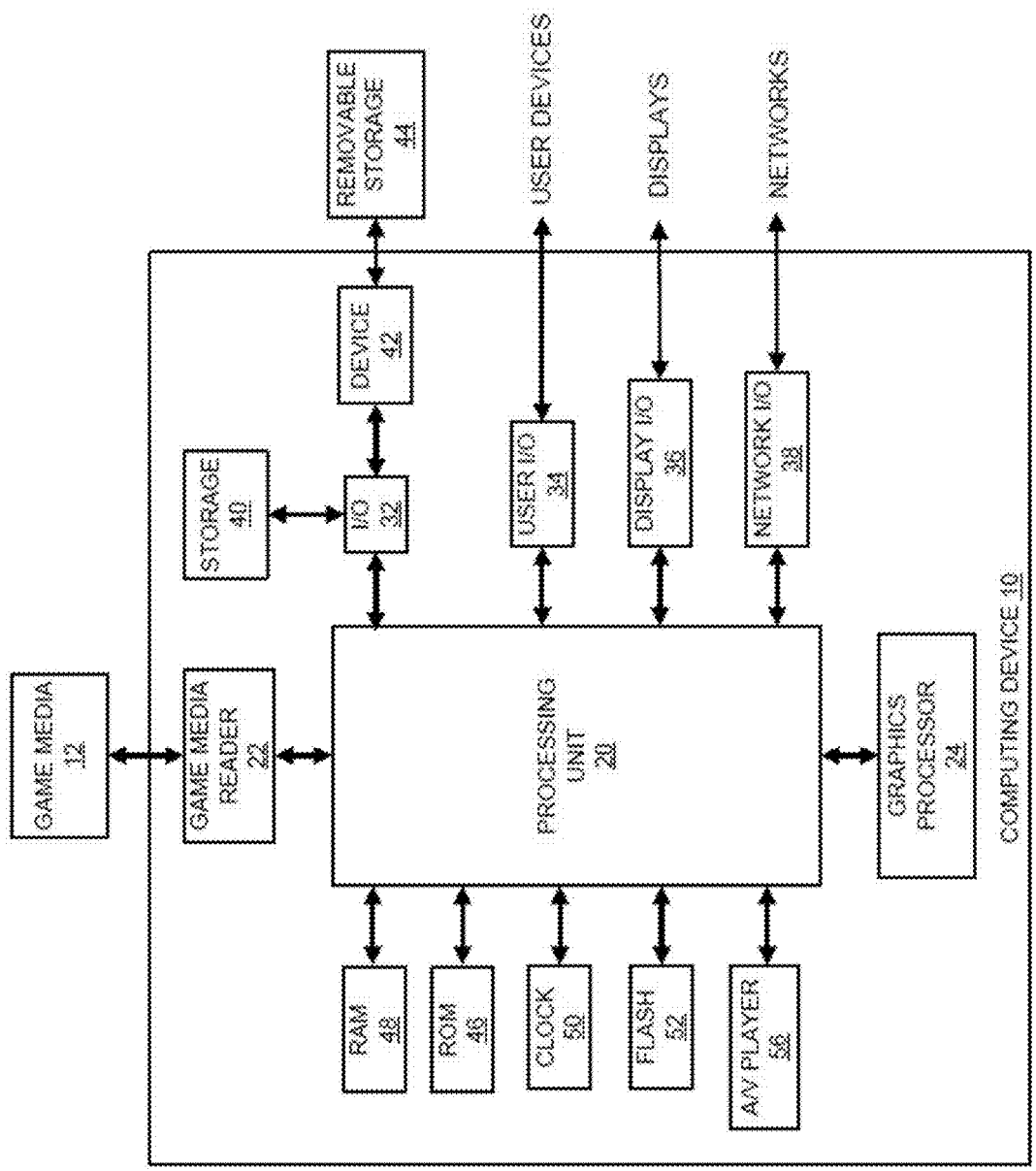
FIG. 10 illustrates an example embodiment of a user computing system.

FIG. 10 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively or additionally, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a video game is being played.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online, application of fraud detection, and/or generation of a fraud detection model.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a video game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
at least one memory storing instructions and game application data; and
at least one processor configured to execute the instructions to perform operations, the operations including:
execute an instance of a game application based in part on the game application data;
generate a virtual game environment within the game application;
determine a first pose of a first virtual character model within the virtual game environment, the first virtual character model comprising a virtual rig including a plurality of a rigid bodies connected by a plurality of joints, wherein the first pose is a first arrangement of the rigid bodies and joints of the virtual rig, wherein position data defines positions of the plurality of joints of the first virtual character model;
receive an instruction to change the first pose of the first virtual character model based at least in part on movement of a joint of the first virtual character model;
obtain a set of axis vectors for the virtual rig of the first virtual character model based on the position data, each axis vector of the set of axis vectors points from a parent joint associated with the axis vector to a child joint of the parent joint;
input the set of axis vectors to a twist model to generate a set of twist vectors, wherein the twist model is configured to predict the set of twist vectors based on the set of axis vectors;
determine animation data based at least in part on the set of axis vectors and the set of twist vectors;
determine an updated pose of first virtual character model based, at least in part, on the animation data;
render the first virtual character model based, at least in part on the updated pose of the first virtual character model; and
generate instructions to output a frame comprising at least a portion of the updated pose of the first virtual character model for a user display.

2. The system of claim 1, wherein the animation data defines, in part, a skinned mesh for the virtual rig.

3. The system of claim 1, wherein each twist vector of the set of twist vectors is orthogonal to a respective axis vector of a same joint.

4. The system of claim 1, wherein the set of axis vectors are based on position data of joints of the virtual rig, and wherein, to determine the animation data based on the set of axis vectors and the set of twist vectors, the operations further comprise: determining a set of rotation vectors for the joints by calculating, for each joint, a cross-product of a corresponding twist vector and a corresponding axis vector associated with the joint, the set of axis vectors, the set of twist vectors, and the set of rotation vectors comprising orientation data; and generating the animation data based on the position data and the orientation data.

5. The system of claim 1, wherein the twist model is a neural network.

6. The system of claim 5, wherein the virtual rig is a target rig, the neural network is trained using a source rig, and the target rig has a higher dimension of joints than the source rig.

7. A computer-implemented method comprising:
executing an instance of a game application based in part on game application data;
generating a virtual game environment within the game application;
determining a first pose of a first virtual character model within the virtual game environment, the first virtual character model comprising a virtual rig including a plurality of a rigid bodies connected by a plurality of joints, wherein the first pose is a first arrangement of the rigid bodies and joints of the virtual rig, wherein position data defines positions of the plurality of joints of the first virtual character model;
receiving an instruction to change the first pose of the first virtual character model based at least in part on movement of a joint of the first virtual character model;
obtaining a set of axis vectors for the virtual rig of the first virtual character model based on the position data, each axis vector of the set of axis vectors points from a parent joint associated with the axis vector to a child joint of the parent joint;
inputting the set of axis vectors to a twist model to generate a set of twist vectors, wherein the twist model is configured to predict the set of twist vectors based on the set of axis vectors;
determining animation data based at least in part on the set of axis vectors and the set of twist vectors;
determining an updated pose of first virtual character model based, at least in part, on the animation data;
rendering the first virtual character model based, at least in part on the updated pose of the first virtual character model; and
generating instructions to output a frame comprising at least a portion of the updated pose of the first virtual character model for a user display.

8. The method of claim 7, wherein the animation data defines, in part, a skinned mesh for the virtual rig.

9. The method of claim 7, wherein each twist vector of the set of twist vectors is orthogonal to a respective axis vector of a same joint.

10. The method of claim 7, wherein the set of axis vectors are based on position data of joints of the virtual rig, and wherein determining the animation data based on the set of axis vectors and the set of twist vectors includes: determining a set of rotation vectors for the joints by calculating, for each joint, a cross-product of a corresponding twist vector and a corresponding axis vector associated with the joint, the set of axis vectors, the set of twist vectors, and the set of rotation vectors comprising orientation data; and wherein determining the animation data includes generating the animation data based on the position data and the orientation data.

11. The method of claim 7, wherein the twist model is a neural network.

12. The method of claim 11, wherein the virtual rig is a target rig, the neural network is trained using a source rig, and the target rig has a higher dimension of joints than the source rig.

13. A non-transitory computer-readable storage medium having stored thereon instructions that, when executed, direct a computing system to perform a method, the method comprising:
executing an instance of a game application based in part on game application data;
generating a virtual game environment within the game application;
determining a first pose of a first virtual character model within the virtual game environment, the first virtual character model comprising a virtual rig including a plurality of a rigid bodies connected by a plurality of joints, wherein the first pose is a first arrangement of the rigid bodies and joints of the virtual rig, wherein position data defines positions of the plurality of joints of the first virtual character model;

receiving an instruction to change the first pose of the first virtual character model based at least in part on movement of a joint of the first virtual character model;

obtaining a set of axis vectors for the virtual rig of the first virtual character model based on the position data, each axis vector of the set of axis vectors points from a parent joint associated with the axis vector to a child joint of the parent joint;

inputting the set of axis vectors to a twist model to generate a set of twist vectors, wherein the twist model is configured to predict the set of twist vectors based on the set of axis vectors;

determining animation data based at least in part on the set of axis vectors and the set of twist vectors;

determining an updated pose of first virtual character model based, at least in part, on the animation data;

rendering the first virtual character model based, at least in part on the updated pose of the first virtual character model; and generating instructions to output a frame comprising at least a portion of the updated pose of the first virtual character model for a user display.

14. The non-transitory computer readable storage medium of claim 13, wherein each twist vector of the set of twist vectors is orthogonal to a respective axis vector of a same joint.

15. The non-transitory computer readable storage medium of claim 13, wherein the set of axis vectors are based on position data of joints of the virtual rig, and wherein determining the animation data based on the set of axis vectors and the set of twist vectors includes: determining a set of rotation vectors for the joints by calculating, for each joint, a cross-product of a corresponding twist vector and a corresponding axis vector associated with the joint, the set of axis vectors, the set of twist vectors, and the set of rotation vectors comprising orientation data; and wherein determining the animation data includes generating the animation data based on the position data and the orientation data.

16. The non-transitory computer readable storage medium of claim 13, wherein the twist model is a neural network.

17. The non-transitory computer readable storage medium of claim 16, wherein the virtual rig is a target rig, the neural network is trained using a source rig, and the target rig has a higher dimension of joints than the source rig.

* * * * *